US011965761B2

(12) United States Patent
Shibata et al.

(10) Patent No.: US 11,965,761 B2
(45) Date of Patent: Apr. 23, 2024

(54) THERMAL FLOW METER

(71) Applicant: Hitachi Astemo, Ltd., Hitachinaka (JP)

(72) Inventors: Mizuki Shibata, Hitachinaka (JP); Takayuki Yogo, Hitachinaka (JP); Akira Uenodan, Hitachinaka (JP); Hiroyuki Abe, Hitachinaka (JP); Binti Haridan Fatin Farhanah, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 108 days.

(21) Appl. No.: 17/796,957

(22) PCT Filed: Dec. 22, 2020

(86) PCT No.: PCT/JP2020/047827
§ 371 (c)(1),
(2) Date: Aug. 2, 2022

(87) PCT Pub. No.: WO2021/166419
PCT Pub. Date: Aug. 26, 2021

(65) Prior Publication Data
US 2023/0332936 A1     Oct. 19, 2023

(30) Foreign Application Priority Data
Feb. 20, 2020   (JP) ................. 2020-027467

(51) Int. Cl.
*G01F 1/684* (2006.01)
*G01F 5/00* (2006.01)

(52) U.S. Cl.
CPC .......... *G01F 1/6842* (2013.01); *G01F 1/6845* (2013.01); *G01F 5/00* (2013.01)

(58) Field of Classification Search
CPC .. G01F 1/684–6847; G01F 5/00; G01F 15/14; G01F 15/18; G01F 15/185; F02D 41/18–187
See application file for complete search history.

(56) References Cited

U.S. PATENT DOCUMENTS

| 6,666,082 B2 * | 12/2003 | Watanabe ............... G01F 1/684 |
| | | 73/204.22 |
| 10,775,215 B2 | 9/2020 | Uenodan et al. |
| 10,876,872 B2 * | 12/2020 | Watanabe ............... G01F 15/14 |

FOREIGN PATENT DOCUMENTS

| JP | 2019-007902 A | 1/2019 |
| JP | 6475860 B2 | 2/2019 |
| JP | 6578238 B2 | 9/2019 |

OTHER PUBLICATIONS

International Search Report, PCT/JP2020/047827, dated Mar. 2, 2021 (3 Pgs.).

* cited by examiner

*Primary Examiner* — Justin N Olamit
(74) *Attorney, Agent, or Firm* — Volpe Koenig

(57) ABSTRACT

Provided is a highly reliable thermal flow meter. In a thermal flow meter 20, a flow rate detection element 321 that detects an air flow rate, and a conductive coating film 400 containing a conductive substance and a resin as constituent elements are provided on at least a part of a portion provided in an auxiliary passage 135 on a surface facing a detection surface 322 of the flow rate detection element 321.

10 Claims, 12 Drawing Sheets

THERMAL FLOW METER

TECHNICAL FIELD

The present invention relates to a thermal flow meter.

BACKGROUND ART

As a technique related to a thermal flow meter for measuring a flow rate of a measurement target gas, for example, there is a technique described in PTL 1.

CITATION LIST

Patent Literature

PTL 1: JP 2019-7902 A

SUMMARY OF INVENTION

Technical Problem

In the thermal flow meter described in PTL 1, a part or all of the plate-shaped member facing a flow rate detection unit is formed of a conductive material, and the conductive material neutralizes charged contaminants contained in the measurement target gas. However, in the thermal flow meter described in PTL 1, the main passage needs to have a complicated shape, and there is room for improvement in reducing the cost of the neutralization function.

The present invention has been made in view of the above, and an object of the present invention is to provide a highly reliable thermal flow meter.

Solution to Problem

In order to solve the above problems, a thermal flow meter according to the present invention includes: a flow rate detection element configured to detect an air flow rate; and a circuit board disposed such that a part of the circuit board faces a detection surface of the flow rate detection element. The circuit board is provided with a conductive resin member including a conductive substance and a resin as constituent elements on at least a part of a portion provided in an auxiliary passage on a surface facing the detection surface of the flow rate detection element.

Advantageous Effects of Invention

According to the present invention, a highly reliable thermal flow meter can be provided.

Objects, configurations, and effects besides the above description will be apparent through the explanation on the following embodiments.

DESCRIPTION OF EMBODIMENTS

Figure 1:
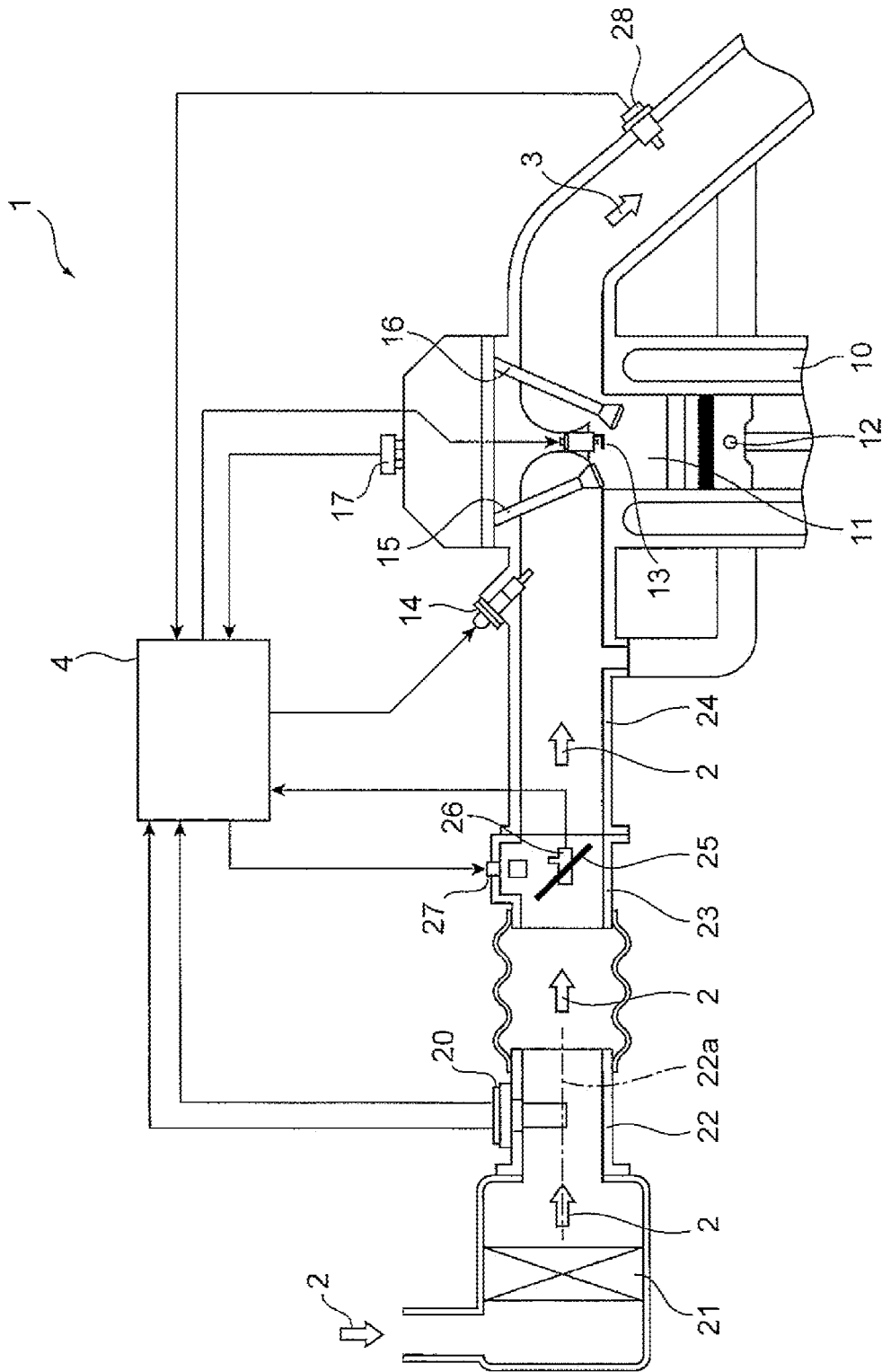
FIG. 1 is a diagram illustrating a configuration of an electronic fuel injection type of internal combustion engine control system using a thermal flow meter according to the present embodiment.

Hereinafter, an embodiment of the present invention will be described using the drawings. Configurations denoted by the same reference numerals in the respective embodiments have similar functions in the respective embodiments unless otherwise specified, and thus the description thereof will be omitted. In addition, in the necessary drawings, orthogonal coordinate axes are described in order to clarify the description of the positions of the respective parts.

As illustrated in FIG. 1, a thermal flow meter 20 mounted on a vehicle is used by being attached to a main passage 22 which is an intake passage of an internal combustion engine 10. As will be described in the following description, the thermal flow meter 20 not only solves the problems described in the section of Technical Problem and exerts the effects described in the section of Advantageous Effects of Invention, but also solves various problems required as a product in sufficient consideration of various problems described above and exerts various effects. Specific problems to be solved and specific effects to be obtained by the thermal flow meter 20 will be described in the following description.

Figure 2:
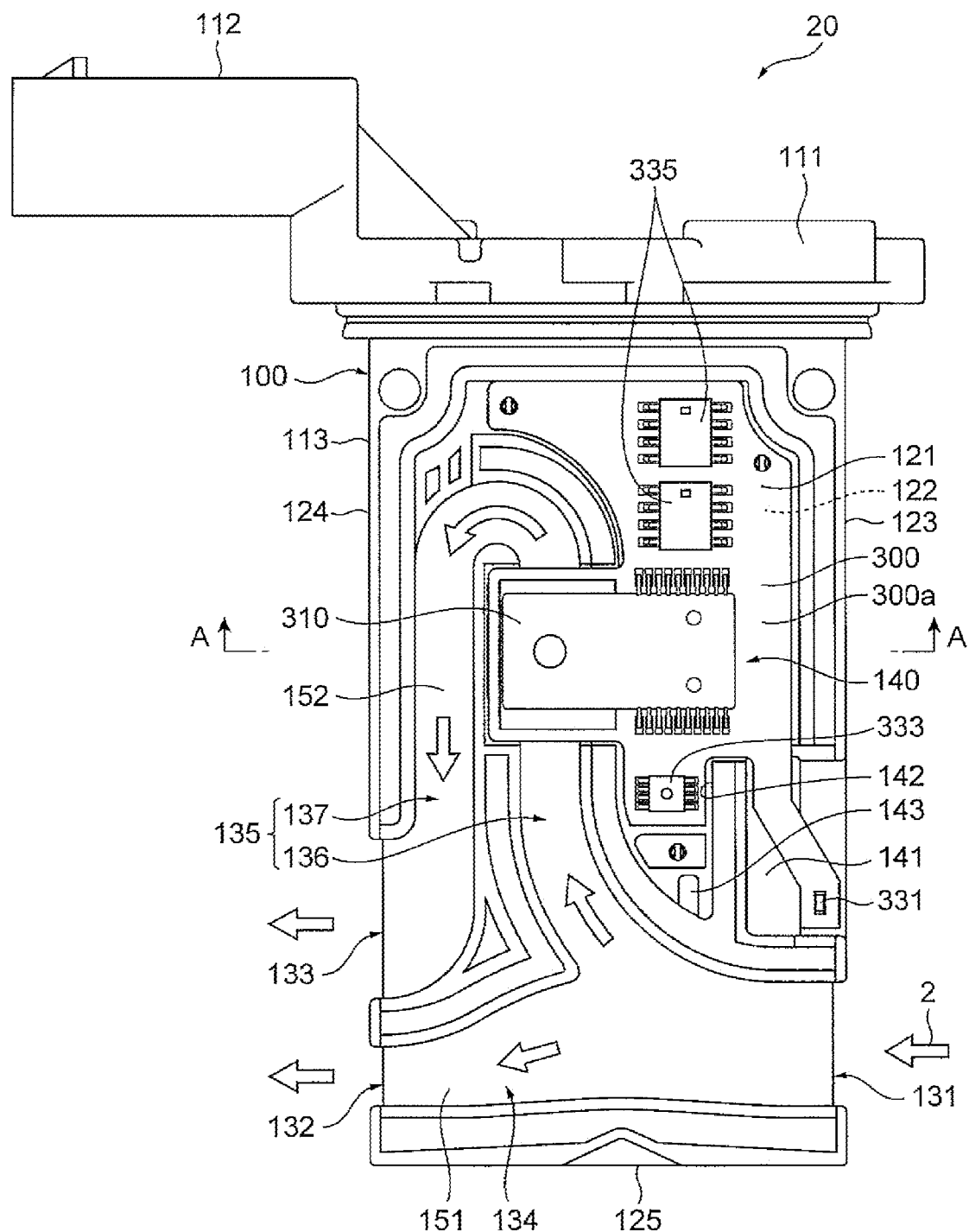
FIG. 2 is a front view of the thermal flow meter according to the present embodiment.
Figure 3:
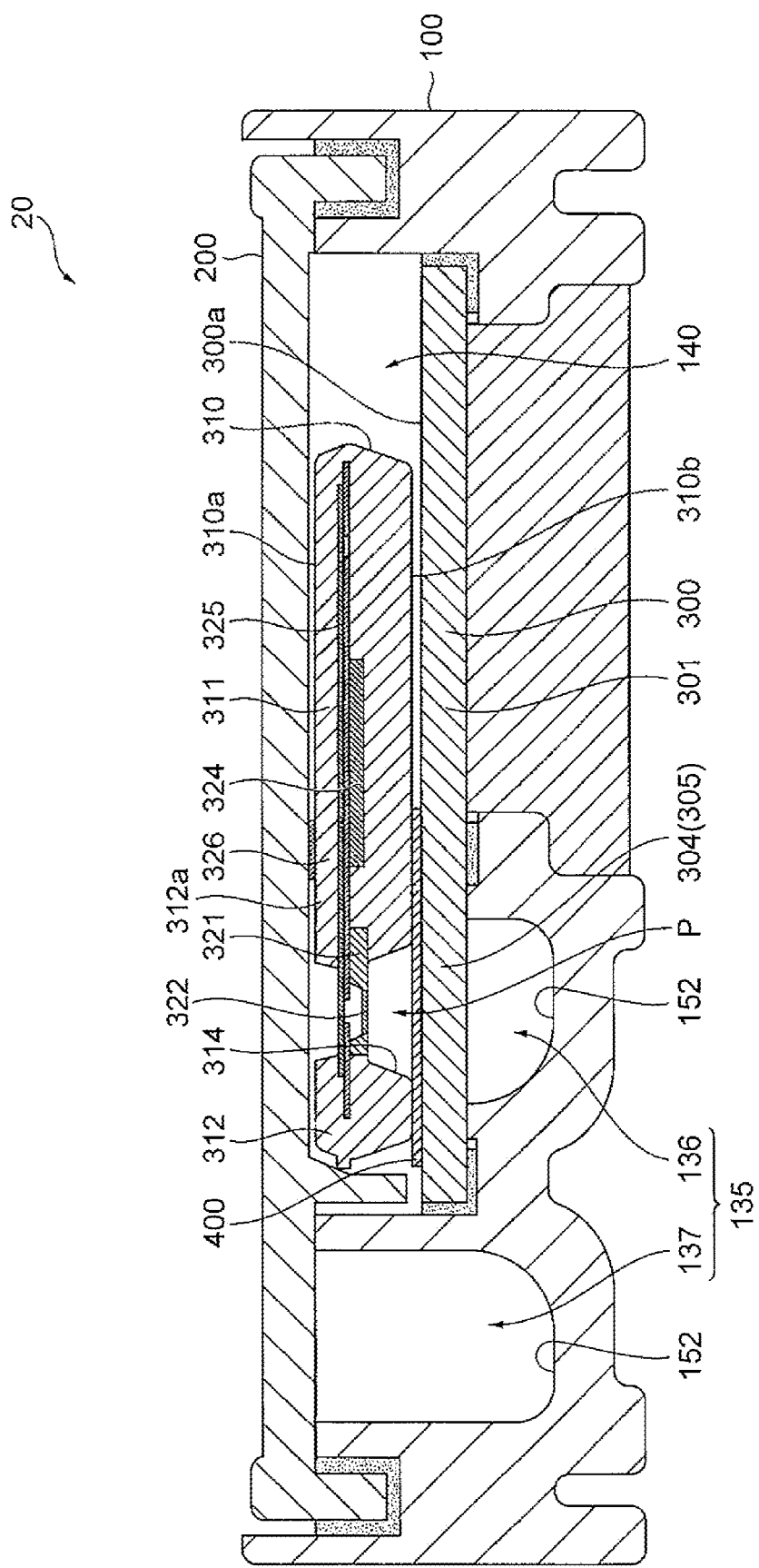
FIG. 3 is a cross-sectional view of the thermal flow meter taken along line A-A illustrated in FIG. 2.
Figure 4:
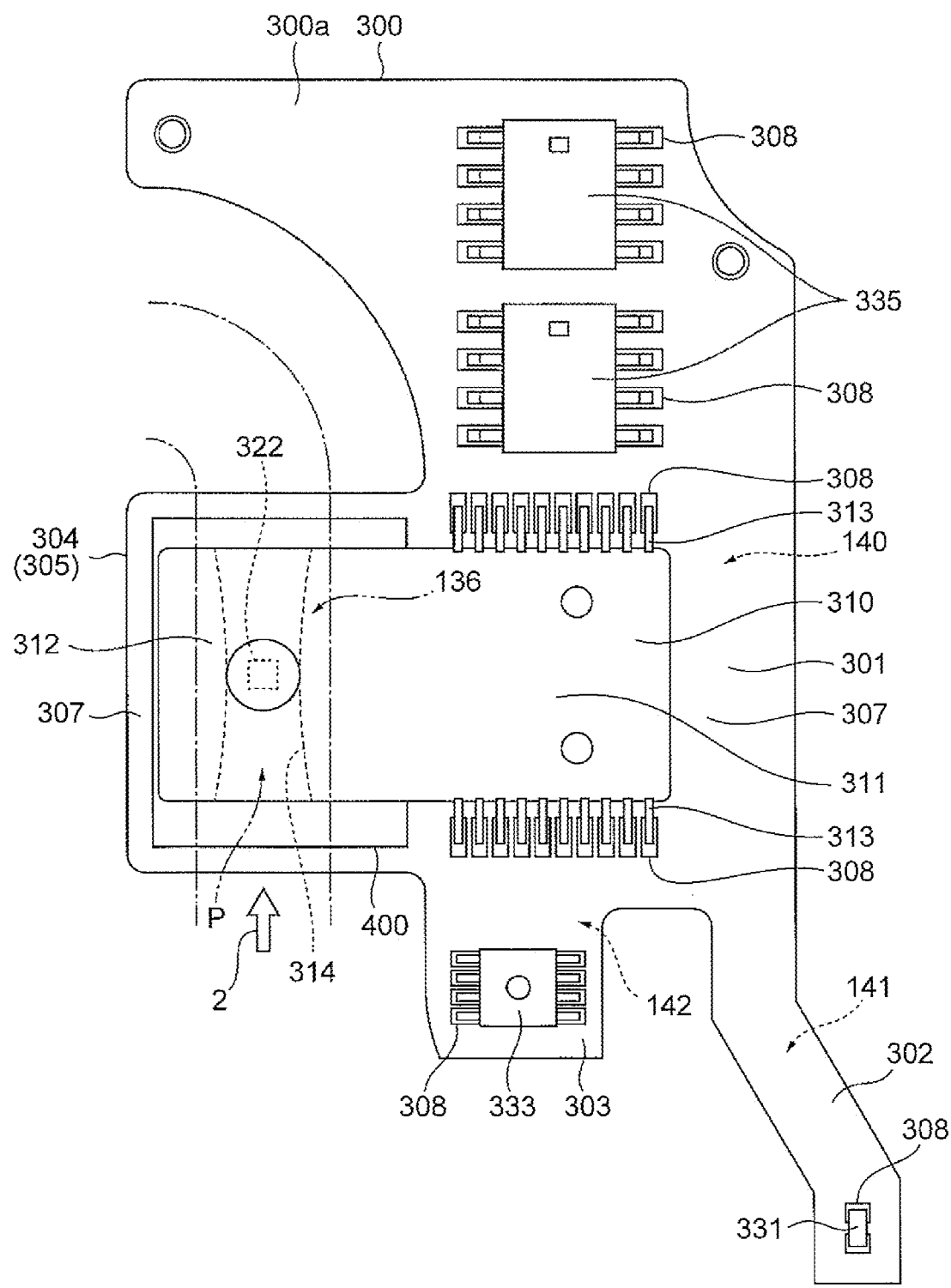
FIG. 4 is a front view of a circuit board from which a housing is removed from FIG. 2.

FIG. 2 is a front view of the thermal flow meter 20 according to the present embodiment. FIG. 2 illustrates a state in which a cover 200 is removed from a housing 100. FIG. 3 is a cross-sectional view of the thermal flow meter 20 taken along line A-A illustrated in FIG. 2. FIG. 4 is a front view of a circuit board 300 in which the housing 100 is removed from FIG. 2. In the following description, it is assumed that a measurement target gas 2 flows along a central axis 22a of the main passage 22 illustrated in FIG. 1.

The thermal flow meter 20 is used in a state of being inserted into the main passage 22 from a mounting hole provided in a passage wall of the main passage 22 and fixed to the main passage 22. The thermal flow meter 20 includes a casing disposed in the main passage 22 through which the measurement target gas 2 flows. The casing of the thermal flow meter 20 includes the housing 100 and the cover 200 attached to the front surface of the housing 100.

The housing 100 is formed by, for example, injection molding a synthetic resin material.

The cover 200 is formed of, for example, a plate-like member made of a metal material or a synthetic resin material. In the present embodiment, an aluminum alloy or a synthetic resin material is formed by injection molding. The cover 200 has a size that entirely covers the front surface of the housing 100.

The housing 100 has a flange 111 for fixing the thermal flow meter 20 to the main passage 22, and a connector 112 protruding from the flange 111 and exposed to the outside from the main passage 22 for electrical connection with an external device. Further, the housing 100 includes a measurement unit 113 that extends so as to protrude from the flange 111 toward the central axis 22a of the main passage 22 in order to measure the physical quantity of the measurement target gas 2 flowing through the main passage 22.

The measurement unit 113 has a thin and long shape extending straight from the flange 111. The measurement unit 113 includes a wide front surface 121 and a wide back surface 122, a pair of narrow side surfaces 123 and 124, and a narrow lower surface 125.

The front surface 121 and the back surface 122 are rectangular surfaces having long sides and short sides in the longitudinal direction and the lateral direction of the measurement unit 113, respectively, and are main surfaces having a large area among the surfaces constituting the measurement unit 113. The front surface 121 and the back surface 122 are disposed in parallel along the central axis 22a of the main passage 22 in a state where the thermal flow meter 20 is attached to the main passage 22. The side surface 123 is located on one side in the lateral direction of the measurement unit 113, and is disposed to face the upstream side of the main passage 22 in a state where the thermal flow meter 20 is attached to the main passage 22. The side surface 124 is located on the other side in the lateral direction of the measurement unit 113, and is disposed to face the downstream side of the main passage 22 in a state where the thermal flow meter 20 is attached to the main passage 22. The lower surface 125 is a surface connected to the front surface 121, the back surface 122, the side surface 123, and the side surface 124. The lower surface 125 is located at the tip portion of the measurement unit 113 separated from the flange 111, and is disposed in parallel along the central axis 22a of the main passage 22 in a state where the thermal flow meter 20 is attached to the main passage 22. In the thermal flow meter 20, since the side surface 123 and the side surface 124 facing the upstream side and the downstream side of the main passage 22 have a narrow shape, it is possible to suppress the fluid resistance to a small value with respect to the measurement target gas 2.

In the present embodiment, the posture of the thermal flow meter 20 in the state of being attached to the main passage 22 is a posture in which the base portion of the measurement unit 113 close to the flange 111 is disposed on the upper side and the tip portion of the measurement unit 113 separated from the flange 111 is disposed on the lower side. However, the posture of the thermal flow meter 20 in the state of being attached to the main passage 22 is not limited to the present embodiment, and various postures can be taken. For example, the posture of the thermal flow meter 20 may be a posture in which the base portion and the tip portion of the measurement unit 113 are horizontally attached so as to be at the same height.

In the measurement unit 113, an inlet 131 of auxiliary passages 134 and 135 is provided in the side surface 123, and a first outlet 132 and a second outlet 133 are provided in the side surface 124. The inlet 131, the first outlet 132, and the second outlet 133 are provided at the tip portion of the measurement unit 113 extending from the flange 111 toward the central axis 22a of the main passage 22. Therefore, the measurement unit 113 can take the measurement target gas 2 flowing in a portion close to the central axis 22a away from the inner surface of the passage wall of the main passage 22 into the auxiliary passages 134 and 135. As a result, the thermal flow meter 20 can measure the flow rate of the measurement target gas 2 flowing in the portion close to the central axis 22a, and can suppress a decrease in measurement accuracy due to the influence of heat or the like.

The measurement unit 113 is provided with a flow rate detection element 321, an intake air temperature sensor 331, and a humidity sensor 333.

The flow rate detection element 321 has a diaphragm-like (thin-film like) detection surface 322, and is disposed in the middle of the auxiliary passages 134 and 135. The flow rate detection element 321 detects the flow rate of the measurement target gas 2 flowing through the main passage 22, that is, the air flow rate. The intake air temperature sensor 331 is disposed in the middle of a temperature detection passage 141 having one end opened in the vicinity of the inlet 131 provided in the side surface 123 and the other end opened to both the front surface 121 and the back surface 122 of the measurement unit 113. The intake air temperature sensor 331 detects the temperature of the measurement target gas 2 flowing through the main passage 22. The humidity sensor 333 is disposed in a humidity measurement chamber 142 of the measurement unit 113. The humidity sensor 333 measures the humidity of the measurement target gas 2 taken into the humidity measurement chamber 142 from a window portion 143 opened in the back surface 122 of the measurement unit 113.

The measurement unit 113 is provided with auxiliary passage grooves 151 and 152 for forming the auxiliary passages 134 and 135 and a circuit chamber 140 for accommodating the circuit board 300.

The circuit chamber 140 and the auxiliary passage grooves 151 and 152 are recessed in the front surface 121 of the measurement unit 113, and are covered by attaching the cover 200 to the front surface of the housing 100. The circuit chamber 140 is provided in a region close to the side surface 123 in the measurement unit 113. The auxiliary passage grooves 151 and 152 are provided over a region closer to the lower surface 125 than the circuit chamber 140 and a region closer to the side surface 124 than the circuit chamber 140 in the measurement unit 113.

The auxiliary passage grooves 151 and 152 form the auxiliary passages 134 and 135 in cooperation with the cover 200 covering the front surface 121 of the measurement unit 113. The auxiliary passage grooves 151 and 152 includes the first auxiliary passage groove 151 and the second auxiliary passage groove 152.

The first auxiliary passage groove 151 is formed to extend along the lateral direction of the measurement unit 113 between the inlet 131 opened to the side surface 123 of the measurement unit 113 and the first outlet 132 opened to the side surface 124 of the measurement unit 113. The first auxiliary passage groove 151 forms the first auxiliary passage 134 in cooperation with the cover 200. The first auxiliary passage 134 takes in the measurement target gas 2 flowing through the main passage 22 from the inlet 131, and returns the taken measurement target gas 2 from the first outlet 132 to the main passage 22. The first auxiliary passage 134 has a flow path extending from the inlet 131 along the flow direction of the measurement target gas 2 in the main passage 22 and leading to the first outlet 132.

The second auxiliary passage groove 152 branches from the middle of the first auxiliary passage groove 151, bends toward the base portion of the measurement unit 113 (toward the flange 111), and extends in the longitudinal direction of the measurement unit 113. Then, the second auxiliary passage groove 152 is bent toward the side surface 124 at the base portion of the measurement unit 113, is folded back toward the tip portion of the measurement unit 113 (toward the lower surface 125) to make a U-turn, and extends again in the longitudinal direction of the measurement unit 113. The second auxiliary passage groove 152 is bent toward the side surface 124 in front of the first outlet 132 and is provided so as to be continuous with the second outlet 133 opened to the side surface 124. The second outlet 133 is disposed to face the downstream side of the main passage 22. The second outlet 133 has an opening area slightly larger than that of the first outlet 132, and is formed at a position adjacent to the base portion side of the measurement unit 113 with respect to the first outlet 132.

The second auxiliary passage groove 152 forms the second auxiliary passage 135 in cooperation with the cover 200. The second auxiliary passage 135 allows the measurement target gas 2 that has branched from the first auxiliary passage 134 and flowed in to pass therethrough and returns the measurement target gas 2 from the second outlet 133 to the main passage 22. The second auxiliary passage 135 has a flow path that reciprocates along the longitudinal direction of the measurement unit 113. That is, the second auxiliary passage 135 includes a forward path portion 136 that branches off in the middle of the first auxiliary passage 134 and extends toward the base portion of the measurement unit 113 (toward the flange 111), and a return path portion 137 that is folded back at the base portion of the measurement unit 113 to make a U-turn and extends toward the tip portion of the measurement unit 113 (toward the lower surface 125). The forward path portion 136 branches off in the middle of the first auxiliary passage 134 and extends in a direction away from the first auxiliary passage 134. The return path portion 137 is folded back at an end portion of the forward path portion 136 to make a U-turn, and extends in a direction approaching the first auxiliary passage 134. The return path portion 137 has a flow path leading to the second outlet 133 opened toward the downstream side of the main passage 22 at a position on the downstream side of the main passage 22 with respect to the inlet 131.

In the second auxiliary passage 135, the flow rate detection element 321 is disposed in the middle of the forward path portion 136. Since the second auxiliary passage 135 is formed so as to extend along the longitudinal direction of the measurement unit 113 and reciprocate, a longer passage length can be secured, and the influence on the flow rate detection element 321 can be reduced when pulsation occurs in the main passage 22. The flow rate detection element 321 is provided in a chip package 310, and the chip package 310 is mounted on the circuit board 300. The chip package 310 is a support body that supports the flow rate detection element 321.

In the present embodiment, an example of the chip package 310 sealed with resin so as to expose at least the detection surface 322 (thin portion) of the flow rate detection element 321 is illustrated as a support body that supports the flow rate detection element 321, but the present invention is not limited thereto. In the chip package 310, since the throttle shape can be integrally formed when the flow rate detection element 321 is resin-sealed, it is possible to reduce the variation in the positional relationship between the flow rate detection element 321 and the throttle shape, and there is an advantage that the detection accuracy of the flow rate is improved.

Circuit components such as the chip package 310, the intake air temperature sensor 331, the humidity sensor 333, and a pressure sensor 335 are mounted on a mounting surface 300a of the circuit board 300. The intake air temperature sensor 331, the humidity sensor 333, and the pressure sensor 335 are not necessarily required, and various sensors to be mounted can be selected according to needs. The circuit board 300 has a substantially rectangular shape in plan view. As illustrated in FIG. 2, the circuit board 300 is disposed in the measurement unit 113 such that the longitudinal direction of the circuit board 300 extends from the base portion toward the tip portion of the measurement unit 113, and the lateral direction of the circuit board 300 extends from the side surface 123 toward the side surface 124 of the measurement unit 113.

As illustrated in FIG. 4, the circuit board 300 includes the main body 301 disposed in the circuit chamber 140, a first protrusion 302 disposed in the temperature detection passage 141, a second protrusion 303 disposed in the humidity measurement chamber 142, and a third protrusion 304 disposed in the forward path portion 136 of the second auxiliary passage 135. The pressure sensor 335 and the chip package 310 are mounted on the main body 301, the intake air temperature sensor 331 is mounted on the tip portion of the first protrusion 302, and the humidity sensor 333 is mounted on the second protrusion 303.

The third protrusion 304 is provided so as to protrude from the circuit chamber 140 to the auxiliary passage grooves 151 and 152. Specifically, the third protrusion 304 is provided to extend from the main body 301 disposed in the circuit chamber 140 toward the forward path portion 136 of the second auxiliary passage 135. The third protrusion 304 has a facing portion 305 facing the detection surface 322 of the flow rate detection element 321 provided in the chip package 310. In other words, the facing portion 305 is constituted by the third protrusion 304 of the circuit board 300.

As illustrated in FIG. 3, the chip package 310 has a resin package structure in which the flow rate detection element 321, an LSI 324, and a lead frame 325 are molded by a resin member 326. The flow rate detection element 321 and the LSI 324 are mounted on the lead frame 325. The resin member 326 seals the lead frame 325 on which the flow rate detection element 321 and the LSI 324 are mounted such that the diaphragm-shaped detection surface 322 of the flow rate detection element 321 is exposed.

The chip package 310 is formed in a rectangular flat plate shape having a predetermined plate thickness. The chip package 310 has a front surface 310a facing the cover 200 and a back surface 310b which is a surface opposite to the front surface 310a in the thickness direction of the chip package 310. The front surface 310a and the back surface 310b of the chip package 310 are large-area main surfaces and are surfaces along the mounting surface 300a of the circuit board 300.

As illustrated in FIGS. 3 and 4, the chip package 310 includes a fixing portion 311 fixed to the main body 301 of the circuit board 300 in the circuit chamber 140, and a projecting portion 312 projecting from the fixing portion 311 toward the second auxiliary passage 135.

The fixing portion 311 of the chip package 310 is provided with a plurality of terminals 313. The plurality of terminals 313 are provided to protrude from both ends in the width direction of the fixing portion 311 of the chip package 310 toward directions away from each other along the width direction of the fixing portion 311. The tip of each terminal 313 is bent in the thickness direction of the fixing portion 311 and is disposed at a position protruding from the back surface 310b of the fixing portion 311. The fixing portion 311 of the chip package 310 is fixed to the main body 301 of the circuit board 300 by bonding the tip of the terminal 313 to the mounting surface 300a of the main body 301 of the circuit board 300 using solder or the like. The fixing portion 311 of the chip package 310 is fixed such that the back surface 310b of the fixing portion 311 and the mounting surface 300a of the main body 301 of the circuit board 300 form a gap in the thickness direction of the fixing portion 311.

The projecting portion 312 of the chip package 310 is disposed to face the third protrusion 304 (facing portion 305) of the circuit board 300 in the forward path portion 136 of the second auxiliary passage 135. In the projecting portion 312 of the chip package 310, a recessed groove 314 recessed from the back surface 310b of the projecting portion 312 toward the front surface 310a is formed. The recessed groove 314 is formed on the back surface 310b of the projecting portion 312 so as to extend over the width direction of the projecting portion 312. The detection surface 322 of the flow rate detection element 321 is disposed to be exposed at an intermediate position in the extending direction of the recessed groove 314.

The chip package 310 is disposed such that the recessed groove 314 extends along the forward path portion 136 of the second auxiliary passage 135. The chip package 310 is disposed such that the detection surface 322 of the flow rate detection element 321 faces the third protrusion 304 (facing portion 305) which is a part of the circuit board 300. In the chip package 310, a passage P is formed between the recessed groove 314 of the projecting portion 312 and the third protrusion 304 (facing portion 305) of the circuit board 300. That is, the recessed groove 314 forms the passage P in cooperation with the third protrusion 304 (facing portion 305). The passage P is a part of the forward path portion 136 of the second auxiliary passage 135 through which the measurement target gas 2 flows. The measurement target gas 2 flowing through the second auxiliary passage 135 passes through the passage P, and the detection surface 322 of the flow rate detection element 321 is exposed.

The detection surface 322 of the flow rate detection element 321 has a pair of temperature sensor resistors and a heater, and acquires a change in the temperature distribution of the measurement target gas 2 in the direction along the passage P. The flow rate detection element 321 detects the flow rate of the measurement target gas 2 passing through the passage P based on the change in the temperature distribution acquired by the detection surface 322. As a result, the thermal flow meter 20 can measure the flow rate of the intake air, which is the measurement target gas 2 taken into the auxiliary passages 134 and 135 from the main passage 22, and output a signal indicating the measurement result to a control device 4.

The intake air as the measurement target gas 2 may contain dust, oil, carbon, or the like as impurities. Most of the impurities such as dust are almost removed by an air cleaner 21, but the impurities composed of fine particles may pass through the air cleaner 21 and be taken into the auxiliary passages 134 and 135 in a small amount. It is known that the impurities composed of fine particles collide with each other to generate charge transfer, and are charged to, for example, a positive electrode.

When the measurement target gas 2 containing the charged impurities is taken into the auxiliary passages 134 and 135 for a long period of time, the charged impurities may accumulate on the detection surface 322 of the flow rate detection element 321 provided in the auxiliary passages 134 and 135. When impurities are deposited on the detection surface 322, the flow rate detection element 321 cannot appropriately detect the temperature distribution of the measurement target gas 2, and there is a possibility that the flow rate of the measurement target gas 2 cannot be appropriately detected. Therefore, it is important not to deposit charged impurities on the detection surface 322.

As one of the methods for reducing the deposition of the charged impurities on the detection surface 322, it is conceivable to add a neutralization function to the thermal flow meter 20 for electrically neutralizing the charged impurities contained in the measurement target gas 2 and reducing the deposition of the impurities on the detection surface 322. This neutralization function is a function of setting the potential of the facing portion 305 of the circuit board 300 forming the passage P where the detection surface 322 is exposed to a potential capable of neutralizing charged impurities. In this neutralization function, the facing portion 305 of the circuit board 300 may have conductivity, but more preferably has a predetermined potential. This is because the charged impurities easily come into contact with the facing portion 305 by the Coulomb force generated between the charged impurities and the facing portion 305 that realizes the neutralization function, and the neutralization of the charged impurities is promoted. Examples of the predetermined potential include a power supply potential and a ground potential.

This neutralization function can be realized, for example, by exposing a wiring pattern having a ground potential of the circuit board 300 to the mounting surface 300a of the circuit board 300 at the facing portion 305 of the circuit board 300. Since the wiring pattern of the circuit board 300 is usually formed of a corrosion-prone metal foil such as a copper foil, plating is applied from the viewpoint of corrosion prevention.

Since the thermal flow meter 20 is a product requiring high reliability such as a vehicle, it is necessary to perform plating of a plurality of layers on the wiring pattern exposed on the mounting surface 300a of the circuit board 300. For example, when the wiring pattern exposed on the mounting surface 300a of the circuit board 300 is a copper foil, electroless Ni plating is applied on the wiring pattern, electroless Pd plating is applied on the electroless Ni plating, and then electroless Au substitution plating is applied. Plating such a plurality of layers on the wiring pattern exposed on the surface of the circuit board 300 can be a factor of greatly increasing the cost of the thermal flow meter 20.

In addition, the wiring pattern exposed on the mounting surface 300a of the circuit board 300 is usually surrounded by an insulating film such as a solder resist from a direction along the mounting surface 300a of the circuit board 300. Therefore, even if plating is applied to the wiring pattern exposed on the mounting surface 300a of the circuit board 300, the plating only covers the upper surface of the wiring pattern, and it is difficult to completely cover the side surface of the wiring pattern adjacent to the insulating film such as solder resist. In particular, when electroless Ni plating is applied, there is a high possibility that the electroless Ni plating is exposed from the side surface of the wiring pattern, and the electroless Ni plating corrodes. When the electroless Ni plating is corroded, the wiring pattern of the circuit board 300 is also likely to be corroded, so that the potential of the facing portion 305 of the circuit board 300 is not appropriately stabilized, and there is a possibility that the neutralization function of impurities is affected. As a result, in the thermal flow meter 20, the charged impurities may easily accumulate on the detection surface 322. As a result, the thermal flow meter 20 may not be able to appropriately detect the flow rate of the measurement target gas 2 for a long period of time.

In the thermal flow meter 20 according to the present embodiment, by sealing a second conductive portion 309 described below, which is a wiring pattern exposed on the mounting surface 300a of the circuit board 300, with a conductive coating film 400 described below, the neutralization function of impurities is reliably realized even at low cost, and a long life is achieved.

Figure 5:
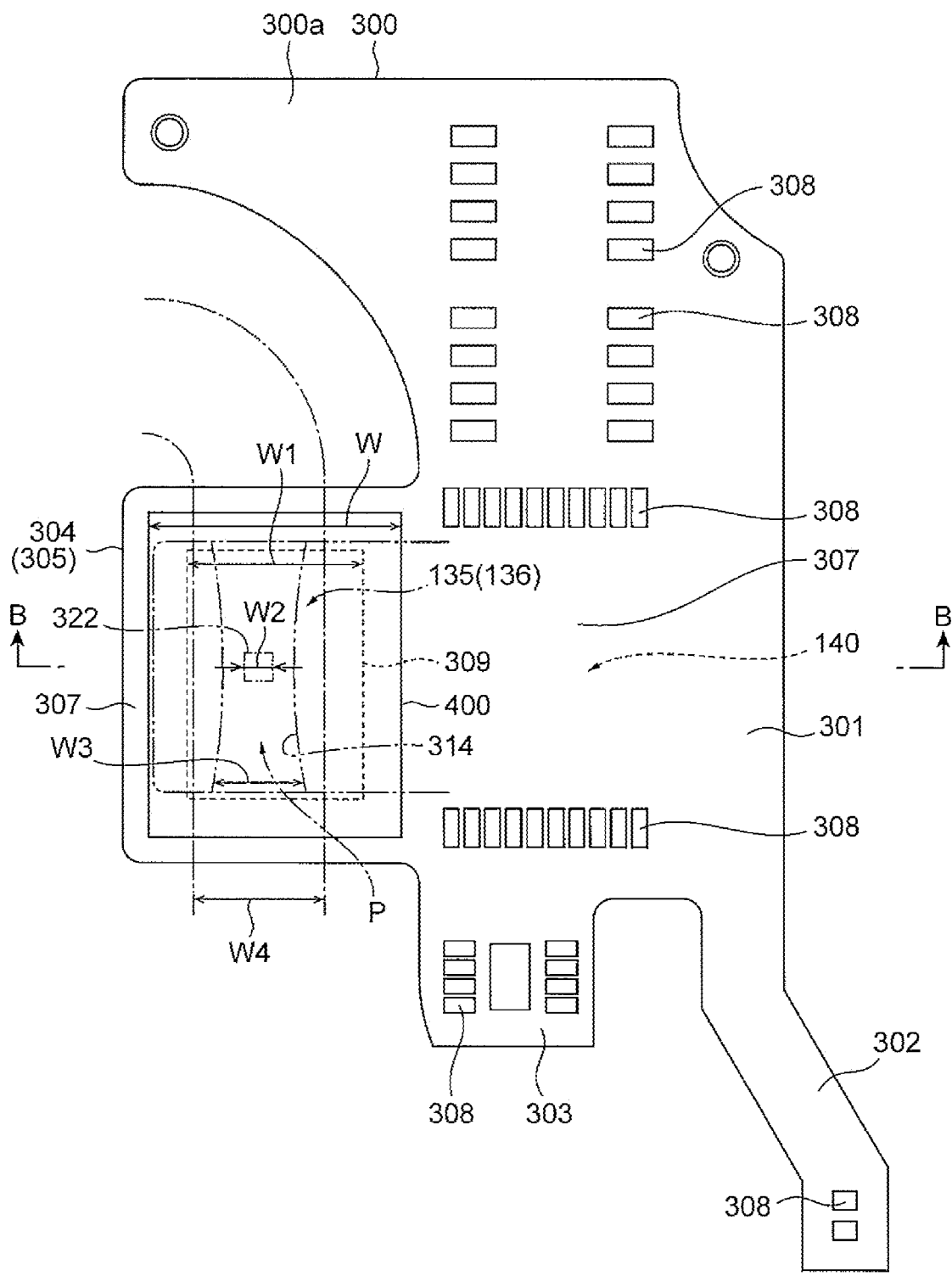
FIG. 5 is a front view of a circuit board from which a circuit component such as a chip package is removed from FIG. 4.
Figure 6:
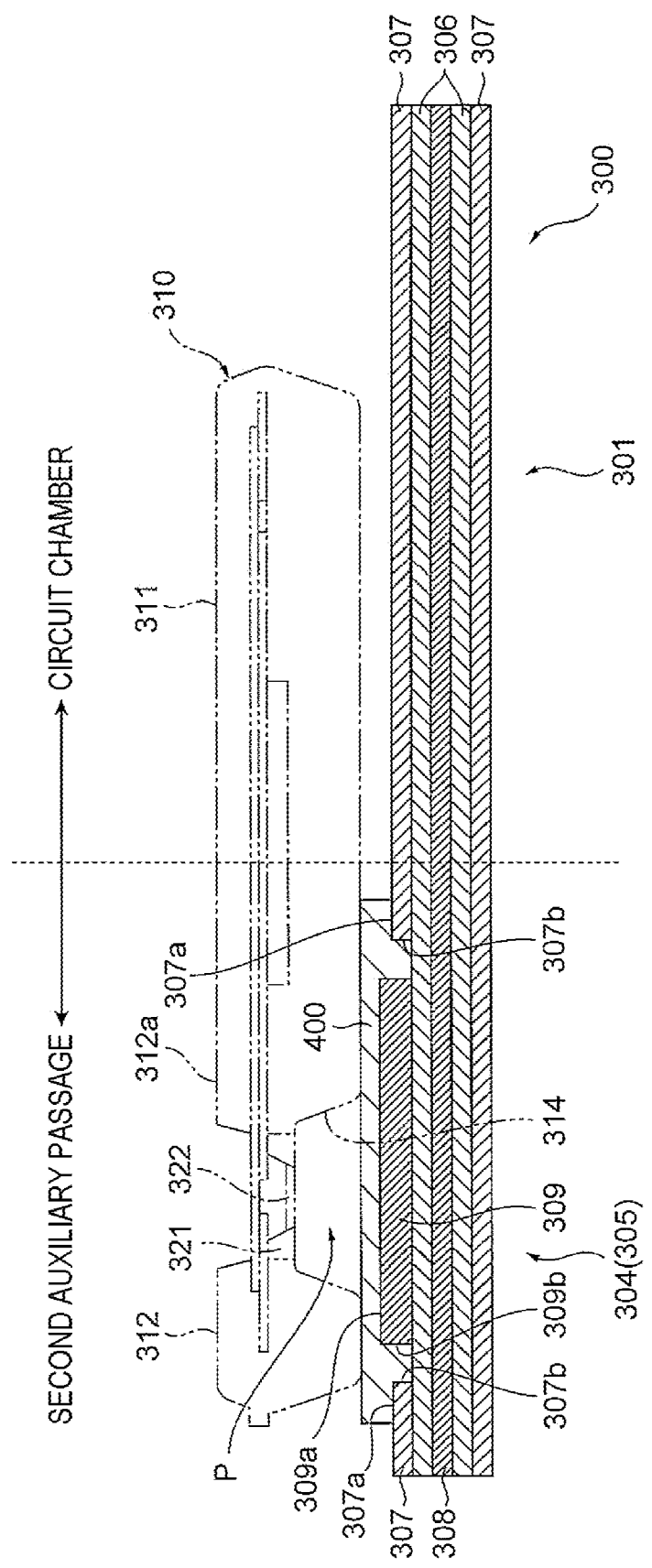
FIG. 6 is a schematic cross-sectional view of the circuit board taken along line B-B illustrated in FIG. 5.

FIG. 5 is a front view of the circuit board 300 from which circuit components such as the chip package 310 are removed from FIG. 4. FIG. 6 is a schematic cross-sectional view of the circuit board 300 taken along line B-B illustrated in FIG. 5.

As illustrated in FIG. 6, the circuit board 300 has a multilayer structure in which insulations 306 and 307 and conductive portions 308 and 309 are laminated.

The insulations 306 and 307 include the first insulation 306 provided as a layer inside the circuit board 300 and constituted by an insulating substrate such as a glass epoxy substrate or a paper phenol substrate, and the second insulation 307 provided as an outermost layer of the circuit board 300 and constituted by an insulating film such as a solder resist. The first insulation 306 sandwiches the conductive portions 308 and 309 provided as a layer inside the circuit board 300. The second insulation 307 surrounds the conductive portions 308 and 309 provided as the outermost layer of the circuit board 300 from the direction along the mounting surface 300a of the circuit board 300.

The conductive portions 308 and 309 are wiring patterns formed of a metal foil such as a copper foil. The conductive portions 308 and 309 include the first conductive portion 308 having a potential other than the ground potential of the circuit board 300 and the second conductive portion 309 having the ground potential. The ground potential of the circuit board 300 may be a potential that can remove charged impurities contained in the measurement target gas 2. When the potential of the charged impurities is the positive electrode, the ground potential of the circuit board 300 may be the negative electrode.

The first conductive portion 308 includes a wiring pattern provided as a layer inside the circuit board 300 as illustrated in FIG. 6, and a wiring pattern provided as an outermost layer of the circuit board 300 as illustrated in FIG. 5. The wiring pattern formed as the outermost layer of the circuit board 300 is, for example, a wiring pattern such as a metal pad to which the terminal 313 of the chip package 310 is bonded. The first conductive portion 308 is provided over the main body 301, the first protrusion 302, the second protrusion 303, and the third protrusion 304 of the circuit board 300.

The second conductive portion 309 is a wiring pattern electrically connected to a wiring pattern on the ground of the circuit board 300. That is, the second conductive portion 309 has the ground potential of the circuit board 300. The second conductive portion 309 is provided as an outermost layer of the circuit board 300. The second conductive portion 309 is a portion exposed from the insulations 306 and 307 of the circuit board 300 to the mounting surface 300a of the circuit board 300. The second conductive portion 309 is provided on the facing portion 305 (third protrusion 304) of the circuit board 300 facing the detection surface 322 of the flow rate detection element 321.

As illustrated in FIG. 5, the second conductive portion 309 has a rectangular shape along the mounting surface 300a of the circuit board 300. The second conductive portion 309 is formed to spread along the extending direction of the forward path portion 136 of the second auxiliary passage 135 and the width direction of the forward path portion 136 of the second auxiliary passage 135. That is, the second conductive portion 309 is formed to spread along the extending direction of the passage P formed by the recessed groove 314 of the chip package 310 and the width direction of the passage P.

The second conductive portion 309 is provided so as to face, via the conductive coating film 400, the inside of the passage P that is a part of the forward path portion 136 of the second auxiliary passage 135 through which the measurement target gas 2 flows. The second conductive portion 309 is provided so as to close the inside of the passage P from the circuit board 300 side at the facing portion 305 of the circuit board 300. The second conductive portion 309 is provided so as to straddle the passage P from the width direction. The second conductive portion 309 is provided so as to extend beyond the width of the passage P to a portion 312a located closer to the circuit chamber 140 than the passage P of the projecting portion 312. In other words, the second conductive portion 309 is provided such that the length W1 along the width of the second auxiliary passage 135, that is, the length W1 along the width of the passage P is longer than the width W3 of the passage P or the width W4 of the forward path portion 136 of the second auxiliary passage 135. However, the length W1 of the second conductive portion 309 along the width of the passage P is preferably equal to or longer than the width W2 of the detection surface 322 of the flow rate detection element 321 provided in the passage P, but is not particularly limited.

The conductive coating film 400 is an example of a conductive resin member containing a conductive substance and a resin as constituent elements, and is applied to the circuit board 300 and formed in a film shape. The conductive substance which is a constituent element of the conductive coating film 400 may be, for example, carbon, or a metal such as silver, copper, or aluminum, or a metal oxide such as tin oxide, tin-doped indium oxide (ITO), or antimony-doped tin oxide (ATO). The resin that is a constituent element of the conductive coating film 400 may be, for example, a resin having adhesiveness to the circuit board 300, such as an epoxy resin, a phenol resin, a fluororesin, or a polyester resin. From the viewpoint of enhancing corrosion resistance, the conductive substance as a constituent element of the conductive coating film 400 is carbon, and from the viewpoint of enhancing chemical resistance and heat resistance, the resin as a constituent element of the conductive coating film 400 is preferably an epoxy resin or a phenol resin. Further, from the viewpoint of enhancing the heat resistance, the resin that is a constituent element of the conductive coating film 400 is more preferably an epoxy resin.

The conductive coating film 400 can be easily adhered to the circuit board 300 only by applying it to the circuit board 300 by printing or spraying and drying and curing it in a thermostatic bath or the like. The step of bonding the conductive coating film 400 to the circuit board 300 is simpler than that in the case of plating, and the production cost is inexpensive. The conductive coating film 400 is cheaper in material cost than plating.

As illustrated in FIG. 5, the conductive coating film 400 is provided on the facing portion 305 of the circuit board 300 facing the detection surface 322 of the flow rate detection element 321. The conductive coating film 400 seals the second conductive portion 309 provided on the facing portion 305 of the detection surface 322. That is, the conductive coating film 400 seals the second conductive portion 309 provided on the third protrusion 304 constituting the facing portion 305. Specifically, as illustrated in FIG. 6, the conductive coating film 400 covers an upper surface 309a facing the detection surface 322 of the second conductive portion 309 and a side surface 309b continuous with the upper surface 309a of the second conductive portion 309 without a gap. Thus, the conductive coating film 400 can seal the second conductive portion 309 which is a wiring pattern exposed on the mounting surface 300a of the circuit board 300. The conductive coating film 400 is in contact with the second conductive portion 309 having a ground potential of the circuit board 300 and has the same ground potential as the second conductive portion 309.

The conductive coating film 400 is provided in the facing portion 305 of the circuit board 300 so as to face the inside of the passage P which is a part of the forward path portion 136 of the second auxiliary passage 135 through which the measurement target gas 2 flows. The conductive coating film 400 seals the second conductive portion 309 provided so as to close the inside of the passage P from the circuit board 300 side. The conductive coating film 400 seals the second conductive portion 309 provided across the passage P from the width direction. The conductive coating film 400 seals the second conductive portion 309 provided so as to extend beyond the width of the passage P to the portion 312a located closer to the circuit chamber 140 than the passage P of the projecting portion 312. In other words, the conductive coating film 400 is provided such that the length W along the width of the second auxiliary passage 135, that is, the length W along the width of the passage P is longer than the length W1 along the width of the passage P of the second conductive portion 309. Preferably, the conductive coating film 400 is provided such that the length W along the width of the passage P is longer than the width W3 of the passage P or the width W4 of the forward path portion 136 of the second auxiliary passage 135.

The conductive coating film 400 comes into contact with the second insulation 307 surrounding the second conductive portion 309 from the direction along the mounting surface 300a of the circuit board 300 to seal the second conductive portion 309. Specifically, the conductive coating film 400 comes into contact with at least one of an upper surface 307a of the second insulation 307 adjacent to the second conductive portion 309 in the direction along the mounting surface 300a of the circuit board 300 and facing the detection surface 322 and a side surface 307b continuous with the upper surface 307a of the second insulation 307 to seal the second conductive portion 309.

In the thermal flow meter 20 according to the present embodiment, the detection surface 322 of the flow rate detection element 321 and a part of the circuit board 300 are disposed to face each other, and a conductive member is provided on at least a part of the facing portion 305 provided in the second auxiliary passage 135 which is a surface facing the detection surface 322 of the circuit board 300. In the thermal flow meter 20, since the neutralization function is realized on the circuit board 300 by a conductive resin member having higher corrosion resistance than plating, it is possible to prolong the life even at low cost and to secure the reliability of the flow rate detection accuracy.

In the thermal flow meter 20, the conductive resin member that realizes the neutralization function is preferably the conductive coating film 400 formed in a film shape by being applied to the circuit board 300. As a result, in the thermal flow meter 20, it is possible to realize the neutralization function in a simple process, and thus, it is possible to further reduce the cost.

In the thermal flow meter 20, the support body supporting the flow rate detection element 321 is mounted on the circuit board 300 as the chip package 310, and the detection surface 322 of the flow rate detection element 321 and the circuit board 300 are disposed to face each other, thereby forming the passage P as the flow rate detection passage. As a result, in the thermal flow meter 20, the influence of the housing 100, the cover 200, and the circuit board 300 can be removed from the factor of the mounting variation of the passage P which is the flow rate detection passage, and the reliability of the flow rate detection accuracy can be improved.

Further, in the thermal flow meter 20, when the conductive coating film 400 which is a conductive resin member provided on the circuit board 300 has a predetermined potential, even if the measurement target gas 2 containing charged impurities flows to the flow rate detection element 321, the charged impurities can be attracted to the conductive coating film 400 by the Coulomb force, and can be moved away from the flow rate detection element 321. In addition, in the thermal flow meter 20, since the conductive coating film 400 can neutralize the charged impurities after attracting, it is possible to further suppress accumulation of impurities on the detection surface 322 of the flow rate detection element 321.

When the conductive coating film 400 is provided so as to overlap the exposed portion (second conductive portion 309) of the wiring of the circuit board 300, the conductive coating film 400 can have a predetermined potential. The predetermined potential may be a ground or a power supply potential. Since most of the impurities having passed through the air cleaner 21 are charged to +(positive electrode), it is more preferable that the second conductive portion 309 covered by the conductive coating film 400 be used as a ground wiring and the conductive coating film 400 be used as a ground potential. In addition, since the conductive coating film 400 overlaps the second conductive portion 309, there is also an advantage that the neutralization function can be formed with a simple configuration. In a case where the neutralization function is to be formed on a member, such as the cover 200, which is not provided with a signal line, a complicated mechanism for connecting the circuit board 300 and the cover 200 is required in order to connect to a predetermined potential. On the other hand, by forming a film by applying a conductive resin member to a part of the circuit board 300 so as to cover wiring of a predetermined potential, the neutralization function having a predetermined potential can be easily realized.

Further, in the thermal flow meter 20, the facing portion 305 facing the flow rate detection element 321 of the circuit board 300 is configured by the third protrusion 304 protruding to the second auxiliary passage 135. In the thermal flow meter 20, it is preferable that the second conductive portion 309 is provided on the third protrusion 304, and the conductive coating film 400 seals the second conductive portion 309 provided on the third protrusion 304.

With the above configuration, in the thermal flow meter 20, the second conductive portion 309 serving as a supply source of a potential that can neutralize impurities is provided via the conductive coating film 400 to face the inside of the second auxiliary passage 135 through which the measurement target gas 2 flows. In the thermal flow meter 20, the distance between the conductive coating film 400 facing the inside of the second auxiliary passage 135 through which the measurement target gas 2 flows and the second conductive portion 309 is extremely short, and the charge supplied from the second conductive portion 309 to the conductive coating film 400 can be immediately diffused over the entire surface of the conductive coating film 400. In the thermal flow meter 20, since the potential of the conductive coating film 400 facing the inside of the second auxiliary passage 135 can be immediately made the same as the potential of the second conductive portion 309, the neutralization function of impurities can be immediately operated. As a result, in the thermal flow meter 20, the deposition of impurities on the detection surface 322 can be further suppressed.

Further, in the thermal flow meter 20, the length W1 of the second conductive portion 309 along the width of the second auxiliary passage 135 is equal to or longer than the width W4 of the second auxiliary passage 135, and the length W of the conductive coating film 400 along the width of the second auxiliary passage 135 is longer than the length W1 of the second conductive portion 309. That is, in the thermal flow meter 20, both the length W of the conductive coating film 400 and the length W1 of the second conductive portion 309 are preferably equal to or larger than the width W4 of the second auxiliary passage 135.

With the above configuration, in the thermal flow meter 20, the potential of the conductive coating film 400 facing the inside of the second auxiliary passage 135 through which the measurement target gas 2 flows can be easily distributed uniformly over the entire second auxiliary passage 135 in the width direction. In the thermal flow meter 20, it is possible to suppress variation in the neutralization function of impurities in the width direction of the second auxiliary passage 135. In addition, in the thermal flow meter 20, since the surface of the conductive coating film 400 facing the inside of the second auxiliary passage 135 can be kept smooth, the measurement target gas 2 can stably flow, so that the flow rate of the measurement target gas 2 can be accurately detected. In the thermal flow meter 20, it is possible not only to appropriately detect the flow rate of the measurement target gas 2 over a long period of time by reducing the deposition of impurities on the detection surface 322 but also to improve the detection accuracy of the flow rate. Therefore, the life of the thermal flow meter 20 can be extended even at low cost, and the detection accuracy can be enhanced.

Further, in the thermal flow meter 20, the conductive coating film 400 preferably comes into contact with the second insulation 307 surrounding the second conductive portion 309 from the direction along the mounting surface 300a of the circuit board 300 to seal the second conductive portion 309.

With the above configuration, in the thermal flow meter 20, the conductive coating film 400 can reliably seal the second conductive portion 309, and the adhesion between the conductive coating film 400 and the circuit board 300 can be improved, so that the neutralization function of impurities can be further prolonged. In the thermal flow meter 20, the deposition of impurities on the detection surface 322 can be further reduced, and the flow rate of the measurement target gas 2 can be appropriately detected for a longer period of time. Therefore, the life of the thermal flow meter 20 can be further extended even at low cost.

Further, in the thermal flow meter 20, the conductive substance, which is a constituent element of the conductive coating film 400, is preferably carbon having high corrosion resistance, and the resin, which is a constituent element of the conductive coating film 400, is preferably an epoxy resin or a phenol resin having high chemical resistance and heat resistance.

With the above configuration, in the thermal flow meter 20, the corrosion resistance, the chemical resistance, and the heat resistance of the conductive coating film 400 can be enhanced, so that the life of the neutralization function of impurities can be further prolonged. In the thermal flow meter 20, the deposition of impurities on the detection surface 322 can be further reduced, and the flow rate of the measurement target gas 2 can be appropriately detected for a longer period of time. Therefore, the life of the thermal flow meter 20 can be further extended even at low cost.

Figure 7:
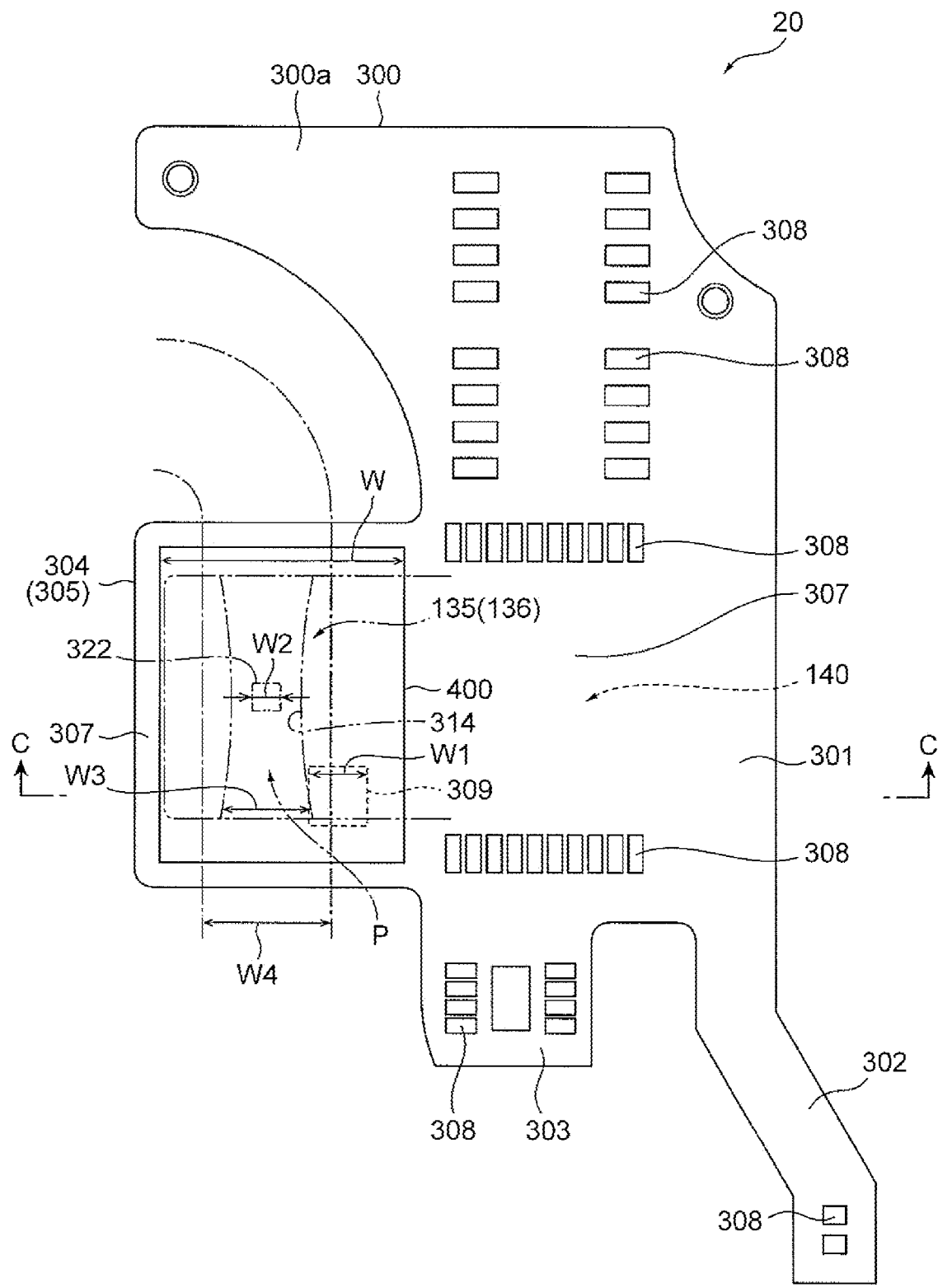
FIG. 7 is a view for explaining Modification 1 of the circuit board and a conductive coating film.
Figure 8:
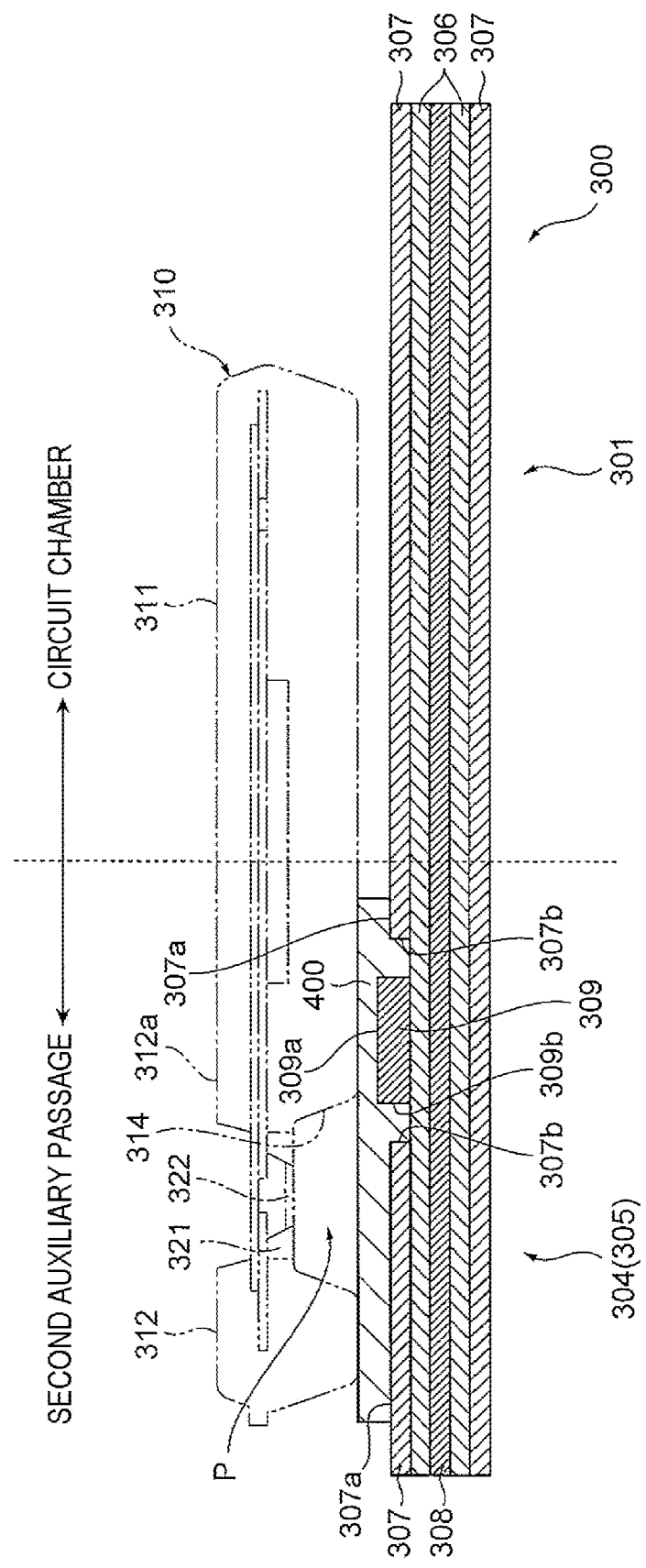
FIG. 8 is a schematic cross-sectional view of the circuit board taken along line C-C illustrated in FIG. 7.

[Modifications of Circuit Board and Conductive Coating Film] FIG. 7 is a view for explaining a first modification of the circuit board 300 and the conductive coating film 400. FIG. 7 corresponds to FIG. 5. FIG. 8 is a schematic cross-sectional view of the circuit board 300 taken along line C-C illustrated in FIG. 7. FIG. 8 corresponds to FIG. 6.

In the circuit board 300 illustrated in FIGS. 5 and 6, the second conductive portion 309 is provided via the conductive coating film 400 to face the inside of the passage P that is a part of the forward path portion 136 of the second auxiliary passage 135 through which the measurement target gas 2 flows. On the other hand, in the circuit board 300 illustrated in FIGS. 7 and 8, the second conductive portion 309 may not be provided via the conductive coating film 400 so as to face the inside of the passage P that is a part of the forward path portion 136 of the second auxiliary passage 135. The conductive coating film 400 illustrated in FIGS. 7 and 8 is provided so as to face the inside of the passage P which is a part of the forward path portion 136 of the second auxiliary passage 135, similarly to the conductive coating film 400 illustrated in FIGS. 5 and 6.

In the thermal flow meter 20 of the first modification illustrated in FIGS. 7 and 8, even if the second conductive portion 309 does not face the inside of the passage P via the conductive coating film 400, the conductive coating film 400 faces the inside of the passage P, and thus, it is possible to reliably realize the neutralization function of impurities even at low cost.

In addition, in the circuit board 300 illustrated in FIGS. 5 and 6, the size of the second conductive portion 309 is slightly smaller than the size of the conductive coating film 400, and there is no large difference between the sizes. On the other hand, in the circuit board 300 illustrated in FIGS. 7 and 8, the size of the second conductive portion 309 may be significantly smaller than the size of the conductive coating film 400. For example, in the circuit board 300 illustrated in FIGS. 5 and 6, the length W1 of the second conductive portion 309 is equal to or larger than the width W4 of the second auxiliary passage 135, whereas in the circuit board 300 illustrated in FIGS. 7 and 8, the length W1 of the second conductive portion 309 may be less than the width W4 of the second auxiliary passage 135. In the conductive coating film 400 illustrated in FIGS. 7 and 8, similarly to the conductive coating film 400 illustrated in FIGS. 5 and 6, the length W along the width of the second auxiliary passage 135 is equal to or larger than the width W4 of the second auxiliary passage 135.

In the thermal flow meter 20 of the first modification illustrated in FIGS. 7 and 8, since the size of the second conductive portion 309 is remarkably small with respect to the size of the conductive coating film 400, the conductive coating film 400 can reliably seal the second conductive portion 309 and can enhance adhesion with the circuit board 300. Further, the thermal flow meter 20 of the first modification illustrated in FIGS. 7 and 8 can reduce the amount of the second conductive portion 309 formed of a relatively expensive material such as a copper foil, so that the material cost can be reduced. Therefore, the thermal flow meter 20 of the first modification illustrated in FIGS. 7 and 8 can further prolong the life of the neutralization function of impurities while further reducing the cost. Therefore, in the thermal flow meter 20 of the first modification illustrated in FIGS. 7 and 8, it is possible to further extend the life even at low cost while further reducing the cost.

Figure 9:
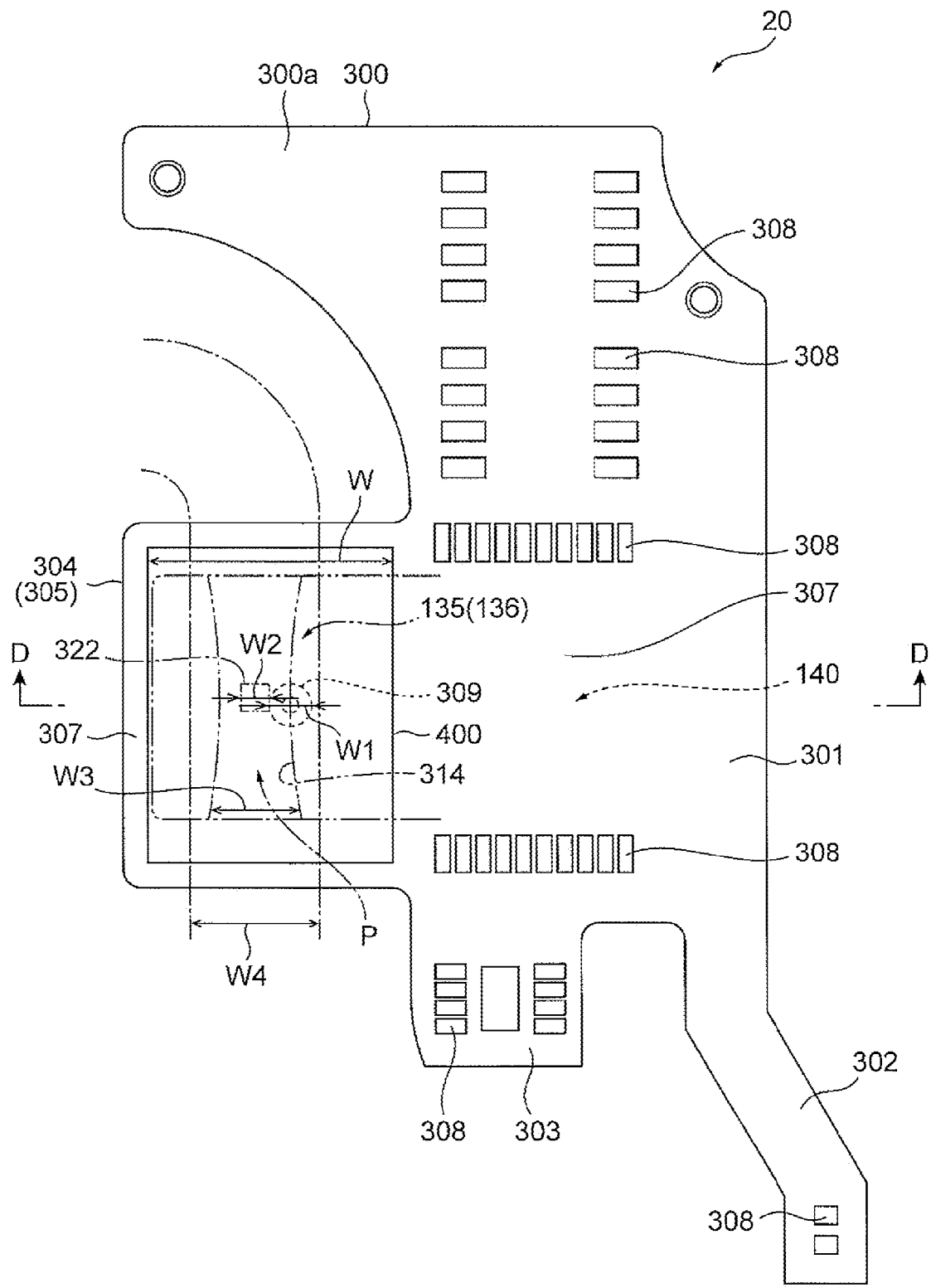
FIG. 9 is a view for explaining Modification 2 of the circuit board and the conductive coating film.
Figure 10:
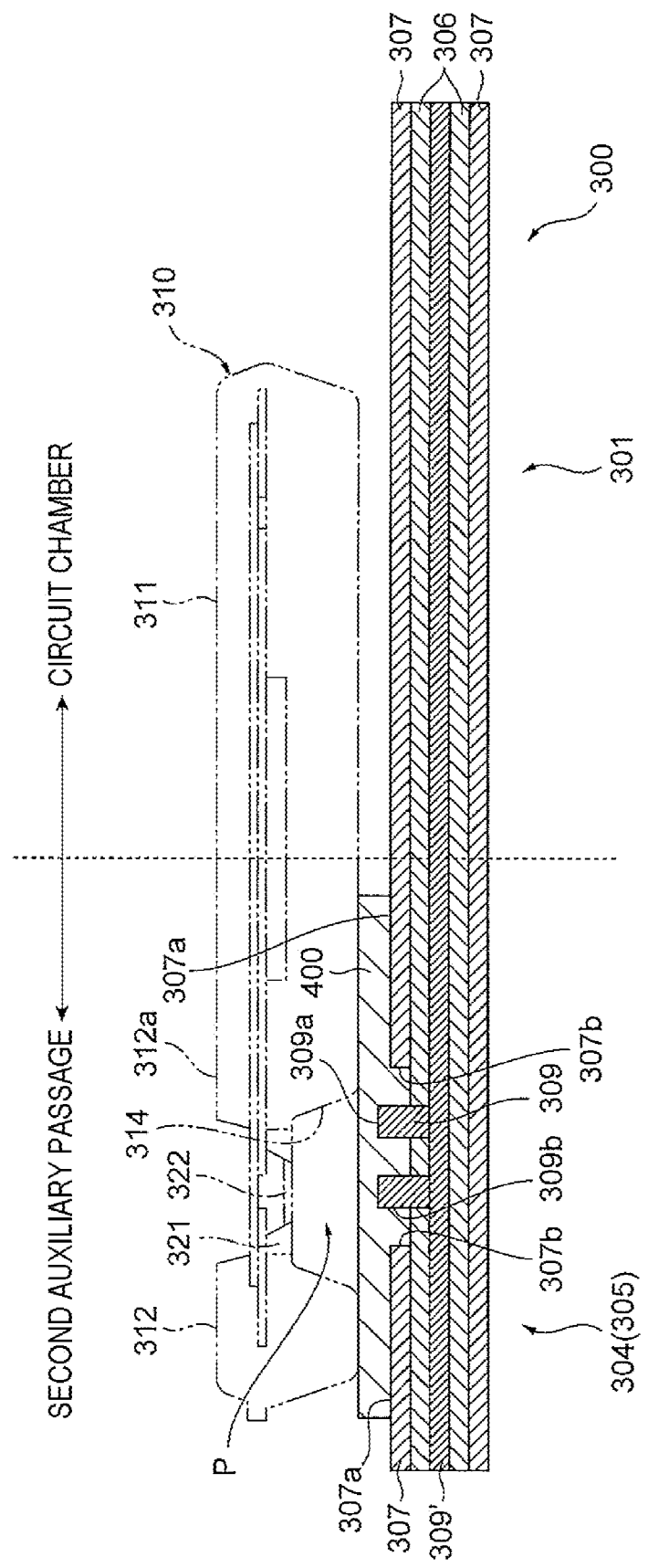
FIG. 10 is a schematic cross-sectional view of the circuit board taken along line D-D illustrated in FIG. 9.

FIG. 9 is a view for explaining a second modification of the circuit board 300 and the conductive coating film 400. FIG. 9 corresponds to FIG. 7. FIG. 10 is a schematic cross-sectional view of the circuit board 300 taken along line D-D illustrated in FIG. 9. FIG. 10 corresponds to FIG. 8.

In the circuit board 300 illustrated in FIGS. 7 and 8, the second conductive portion 309 is formed of a metal foil such as a copper foil which is significantly smaller than the size of the conductive coating film 400. On the other hand, in the circuit board 300 illustrated in FIGS. 9 and 10, the second conductive portion 309 may be formed by a through hole. The second conductive portion 309 formed by the through hole is electrically connected to a ground wiring pattern 309' provided as a layer inside the circuit board 300.

Similarly to the thermal flow meter 20 of the first modification illustrated in FIGS. 7 and 8, the thermal flow meter 20 of the second modification illustrated in FIGS. 9 and 10 can extend the life of the neutralization function of impurities while reducing the cost. Therefore, in the thermal flow meter 20 of the second modification illustrated in FIGS. 9 and 10, the life can be extended even at low cost.

Figure 11:
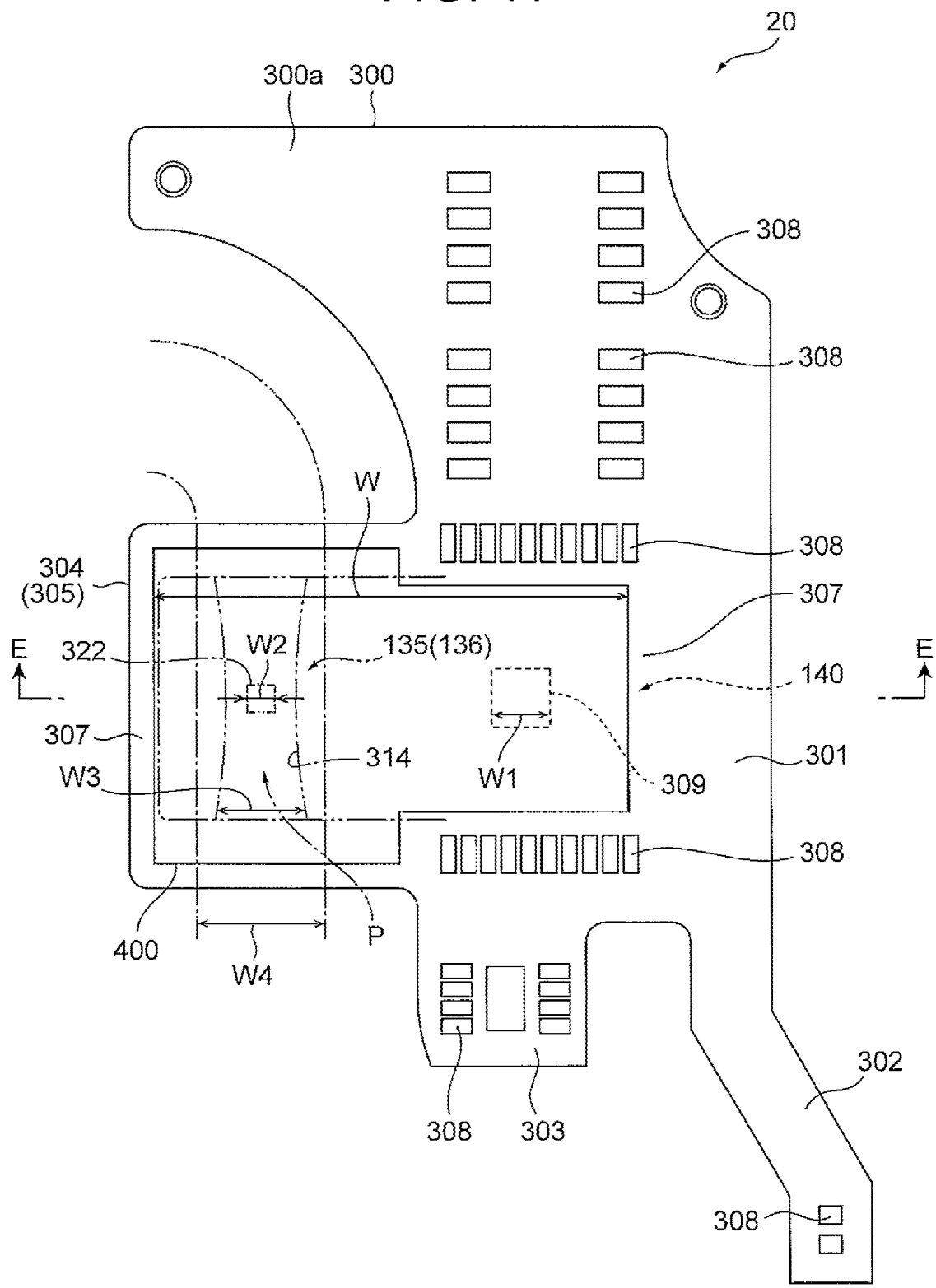
FIG. 11 is a view for explaining Modification 3 of the circuit board and the conductive coating film.
Figure 12:
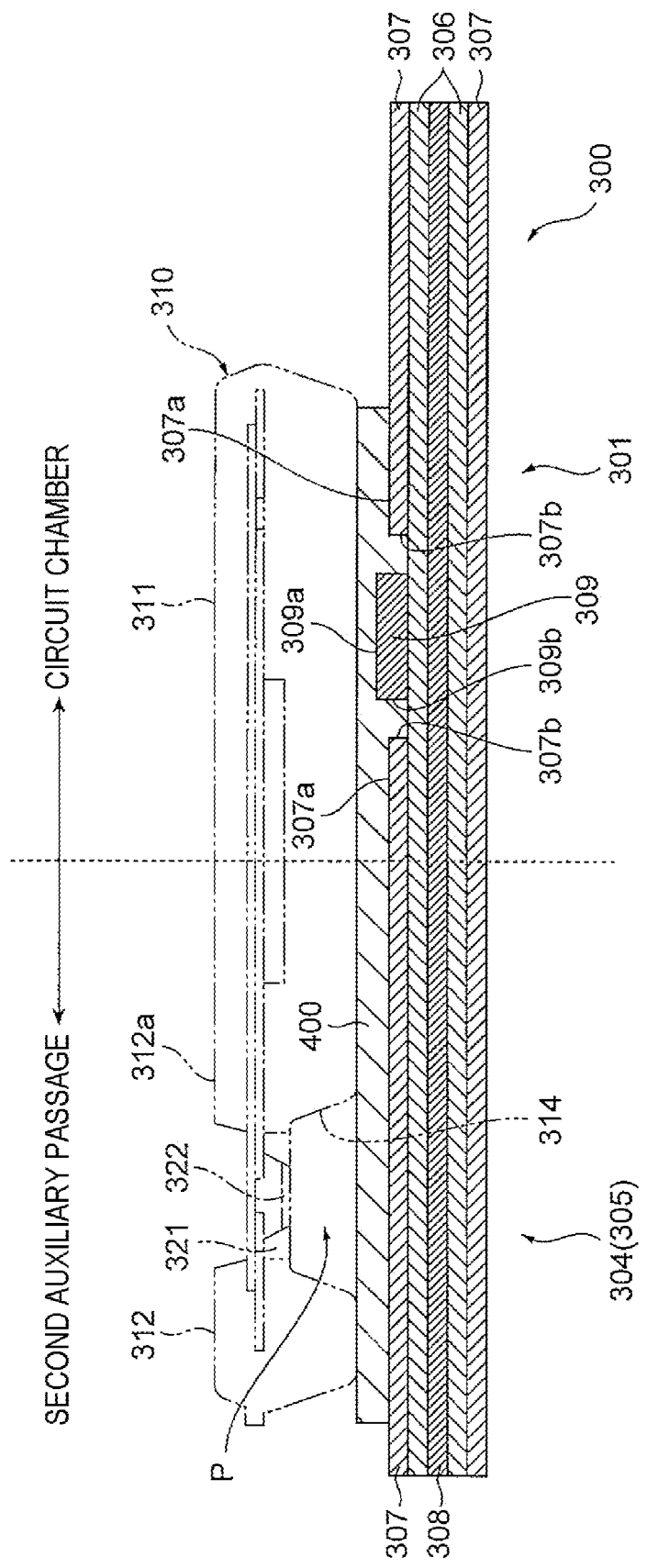
FIG. 12 is a schematic cross-sectional view of the circuit board taken along line E-E illustrated in FIG. 11.

FIG. 11 is a view for explaining a third modification of the circuit board 300 and the conductive coating film 400. FIG. 11 corresponds to FIG. 7. FIG. 12 is a schematic cross-sectional view of the circuit board 300 taken along line E-E illustrated in FIG. 11. FIG. 12 corresponds to FIG. 8.

In the circuit board 300 illustrated in FIGS. 7 and 8, the second conductive portion 309 is provided on the third protrusion 304 of the circuit board 300. The conductive coating film 400 illustrated in FIGS. 7 and 8 seals the second conductive portion 309 provided on the third protrusion 304. On the other hand, in the circuit board 300 illustrated in FIGS. 11 and 12, the second conductive portion 309 may be provided in the main body 301 of the circuit board 300. The conductive coating film 400 illustrated in FIGS. 11 and 12 may be provided from the third protrusion 304 of the circuit board 300 to the main body 301 to seal the second conductive portion 309 provided in the main body 301.

In the thermal flow meter 20 of the third modification illustrated in FIGS. 11 and 12, since the second conductive portion 309 is provided in the main body 301 separated from the passage P, the heat of the second conductive portion 309 is hardly transmitted to the measurement target gas 2 flowing through the passage P. In the thermal flow meter 20 of the third modification illustrated in FIGS. 11 and 12, the temperature distribution of the measurement target gas 2 acquired on the detection surface 322 is hardly affected by the heat of the second conductive portion 309, so that the flow rate of the measurement target gas 2 can be more accurately detected. Therefore, in the thermal flow meter 20 of the third modification illustrated in FIGS. 11 and 12, the life can be extended even at low cost, and the detection accuracy can be increased.

In the above embodiment, the case where the second conductive portion 309 has the ground potential of the circuit board 300 has been described as an example. However, the second conductive portion 309 only needs to have a potential that can remove charged impurities, and may have a potential other than the ground potential of the circuit board 300. In this case, the second conductive portion 309 may be a conductive portion such as a wiring pattern exposed from the insulations 306 and 307 of the circuit board 300 to the mounting surface 300a, and is insulated from a wiring pattern having the ground potential of the circuit board 300.

[Others] Note that the present invention is not limited to the above embodiments, and includes various modifications.

For example, the above-described embodiments of the present invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

Each of the above configurations, functions, processing units, processing means, and the like may be partially or entirely achieved by hardware by, for example, designing by an integrated circuit. In addition, the configurations and the functions may be realized in software such that a processor analyzes and performs a program which realizes each function. Information such as a program, a tape, and a file for realizing each function can be stored in a recording device such as a memory, a hard disk, and a solid state drive (SSD), or a recording medium such as an IC card, an SD card, and a DVD.

In addition, only control lines and information lines considered to be necessary for explanation are illustrated, but not all the control lines and the information lines for a product are illustrated. In practice, almost all the configurations may be considered to be connected to each other.

REFERENCE SIGNS LIST

2 measurement target gas
20 thermal flow meter
22 main passage
135 second auxiliary passage
140 circuit chamber
300 circuit board
301 main body
304 third protrusion
305 facing portion
307 second insulation
309 second conductive portion
310 chip package
321 flow rate detection element
322 detection surface
400 conductive coating film

The invention claimed is:
1. A thermal flow meter comprising:
a flow rate detection element configured to detect an air flow rate; and
a circuit board disposed such that a part of the circuit board faces a detection surface of the flow rate detection element, wherein
the circuit board is provided with a conductive resin member including a conductive substance and a resin as constituent elements on at least a part of a portion provided in an auxiliary passage on a surface facing the detection surface of the flow rate detection element,
wherein the conductive resin member is a conductive coating film formed in a film shape by being applied to the circuit board, wherein the conductive coating film is provided so as to seal a conductive portion having a predetermined potential formed on the circuit board.

2. The thermal flow meter according to claim 1, wherein the circuit board further includes a wiring and an insulating film provided so as to cover the wiring, and the conductive portion is a portion of the wiring exposed from the insulating film.

3. The thermal flow meter according to claim 1, further comprising: a circuit chamber adjacent to the auxiliary passage to accommodate the circuit board, wherein the auxiliary passage is a passage that takes in a part of a measurement target gas flowing through a main passage, the circuit board includes a main body disposed in the circuit chamber and a protrusion protruding from the circuit chamber to the auxiliary passage, the conductive portion is provided on the protrusion, and the conductive coating film is provided on the protrusion.

4. The thermal flow meter according to claim 3, wherein
a length of the conductive portion along a width of the auxiliary passage is equal to or larger than the width of the auxiliary passage, and
in the conductive coating film, the length along the width of the auxiliary passage is longer than the length of the conductive portion along the width of the auxiliary passage.

5. The thermal flow meter according to claim 3, wherein
a length of the conductive portion along a width of the auxiliary passage is less than the width of the auxiliary passage, and
in the conductive coating film, the length along the width of the auxiliary passage is equal to or larger than the width of the auxiliary passage.

6. The thermal flow meter according to claim 1, further comprising: a circuit chamber adjacent to the auxiliary passage to accommodate the circuit board, wherein the auxiliary passage is a passage that takes in a part of a measurement target gas flowing through a main passage, the circuit board includes a main body disposed in the circuit chamber and a protrusion protruding from the circuit chamber to the auxiliary passage, the conductive portion is provided on the main body, and the conductive coating film is provided from the protrusion to the main body.

7. The thermal flow meter according to claim 1, wherein the predetermined potential is a ground potential.

8. The thermal flow meter according to claim 1, wherein
the conductive substance is carbon, and
the resin is an epoxy resin or a phenol resin.

9. The thermal flow meter according to claim 1, further comprising:
a support body configured to support the flow rate detection element, wherein
the support body is mounted on the circuit board such that the detection surface of the detection element faces a part of the circuit board.

10. The thermal flow meter according to claim 9, wherein the support body is a chip package formed by sealing with a resin so as to expose at least the detection surface of the flow rate detection element.

* * * * *